US012685976B2

(12) United States Patent
Yamada et al.

(10) Patent No.: US 12,685,976 B2
(45) Date of Patent: Jul. 21, 2026

(54) WET ATOMIZER

(71) Applicant: SUGINO MACHINE LIMITED, Namerikawa City (JP)

(72) Inventors: Yuuya Yamada, Namerikawa City (JP); Keiichi Katayama, Namerikawa City (JP); Masashi Tsunemoto, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 584 days.

(21) Appl. No.: 18/326,718

(22) Filed: May 31, 2023

(65) Prior Publication Data

US 2023/0398505 A1 Dec. 14, 2023

(30) Foreign Application Priority Data

Jun. 14, 2022 (JP) ................................. 2022-095728

(51) Int. Cl.

*B01F 23/00* (2022.01)
*B01F 23/40* (2022.01)
*B01F 23/41* (2022.01)
*B01F 35/21* (2022.01)
*B01F 35/221* (2022.01)

(52) U.S. Cl.

CPC .............. *B01F 23/49* (2022.01); *B01F 23/41* (2022.01); *B01F 35/2113* (2022.01); *B01F 35/2213* (2022.01)

(58) Field of Classification Search

CPC ............................ B01F 23/41; B01F 35/2213
See application file for complete search history.

(56) References Cited

U.S. PATENT DOCUMENTS

2006/0131451 A1* 6/2006 Naito ...................... B01F 23/41 241/1
2021/0162442 A1* 6/2021 Gormanns .......... B05B 13/0627

FOREIGN PATENT DOCUMENTS

JP S5147902 U 4/1976
JP 2897915 B2 5/1999
JP 3151706 B2 4/2001
JP 6045372 B2 12/2016

* cited by examiner

*Primary Examiner* — Anshu Bhatia
(74) *Attorney, Agent, or Firm* — United IP Counselors, LLC

(57) ABSTRACT

Provided is a wet atomizer capable of stably increasing a pressure in a pressurizing chamber and performing highly reproducible raw material process. A wet atomizer includes a motor; a power transmission device that converts a rotational motion of the motor into a reciprocating motion; a high-pressure cylinder; a plunger that reciprocates inside the high-pressure cylinder by the power transmission device to pressurize raw materials; a drive controller that controls the reciprocating motion of the plunger; a nozzle that atomizes pressurized raw material; a first check valve disposed downstream of the nozzle; and a first elastic member that presses the first check valve.

20 Claims, 7 Drawing Sheets

WET ATOMIZER

CROSS-REFERENCE TO RELATED APPLICATIONS

This application claims the benefit of priority to Japanese Patent Application No. 2022-095728, filed on Jun. 14, 2022, the entire contents of which are hereby incorporated by reference.

BACKGROUND

1. Technical Field

The present invention relates to a wet atomizer.

2. Description of the Background

In a wet atomizer, raw material is pressurized to a high pressure of a maximal 245 MPa by a water jet, and high-speed ejection is performed from a fine nozzle having an ejection aperture of 0.05 to 0.5 mm. As a result, by colliding particles with other particles or hard members at the time of jetting, the shearing force generated by the nozzle passage and the counter flow, or the impact force by the jet cavitation, the secondary aggregated particles, which are mainly primary particles aggregated, are disintegrated or dispersed (e.g., Japanese Patent No. 3151706, hereinafter, Patent Literature 1).

In such a wet atomizer, a booster type (pressure increasing type) using a hydraulic drive is used for obtaining high pressure of 245 MPa. On the other hand, in the manufacture of pharmaceuticals, precision electronic components, and the like, there is a tendency to dislike the atmosphere itself in which driving oil is used in order to prevent pollution. An atomizer that uses a motor as a drive source and aims to have a small size has been proposed (for example, Japanese Patent No. 2897915, hereinafter, Patent Literature 2).

An electric wet atomizer which uses an electric motor as a drive source instead of a hydraulic drive and which is small in size and can be used in a simple laboratory or the like with a 100V power source is also proposed (for example, Japanese Patent No. 6045372, hereinafter, Patent Literature 3). The electric wet atomizer can easily replace the high-pressure packing sealing member attached in the cylinder.

A pump device capable of smoothly absorbing and supplying water by disposing a coil spring, a steel ball, or the like in a suction pipe and a discharge pipe, respectively is also proposed (for example, Japanese Utility Model Application Publication S51-47902, hereinafter, Patent Literature 4).

BRIEF SUMMARY

Even in the case of a small-sized wet atomizer, there are a plurality of variations in nozzle diameters at the time of injecting, refining, crushing, and dispersing a raw material. If it is desired to increase the throughput, a nozzle having a relatively large diameter is used. In this case, the amount of the raw material passing through the nozzle or the peripheral device increases, and the pressurization and depressurization energy when the plunger reciprocates in the high-pressure cylinder also increases. For this reason, outside air is taken in from a portion where the wet atomizer communicates with the outside, such as a nozzle or an ejection portion, and a blur occurs in an increase in pressure in the high-pressure cylinder that becomes a pressurizing chamber. This varies the pressure for processing the raw material, and the characteristics of the processed raw material become unstable.

In addition, in the valve structures as disclosed in Patent Literature 4, a fluid having low viscosity and high fluidity such as water is assumed. However, a wet atomizer often processes raw materials having high viscosity. Thus, even when such a valve structure is used, the raw material could adhere to the inside of the valve to cause clogging of the raw material. This cannot apply an appropriate pressure, and the characteristics of the raw material after the processing become unstable.

An object of the present invention is to provide a wet atomizer capable of stably increasing the pressure in a pressurizing chamber and performing a highly reproducible raw material process.

A first aspect of the present invention provides a wet atomizer, including:

- a motor;
- a power transmission device configured to convert a rotational motion of the motor into a reciprocating motion;
- a high-pressure cylinder;
- a plunger configured to reciprocate inside the high-pressure cylinder by the power transmission device to pressurize raw materials;
- a drive controller configured to control the reciprocating motion of the plunger;
- a nozzle configured to atomize pressurized raw material;
- a first check valve disposed downstream of the nozzle; and
- a first elastic member configured to press the first check valve.

The wet atomizer according to the present invention allows to stably increase the pressure in the pressurizing chamber, and to perform a highly reproducible raw material process.

DETAILED DESCRIPTION

Hereinafter, an embodiment will be described with reference to the drawings as appropriate.

Figure 1:
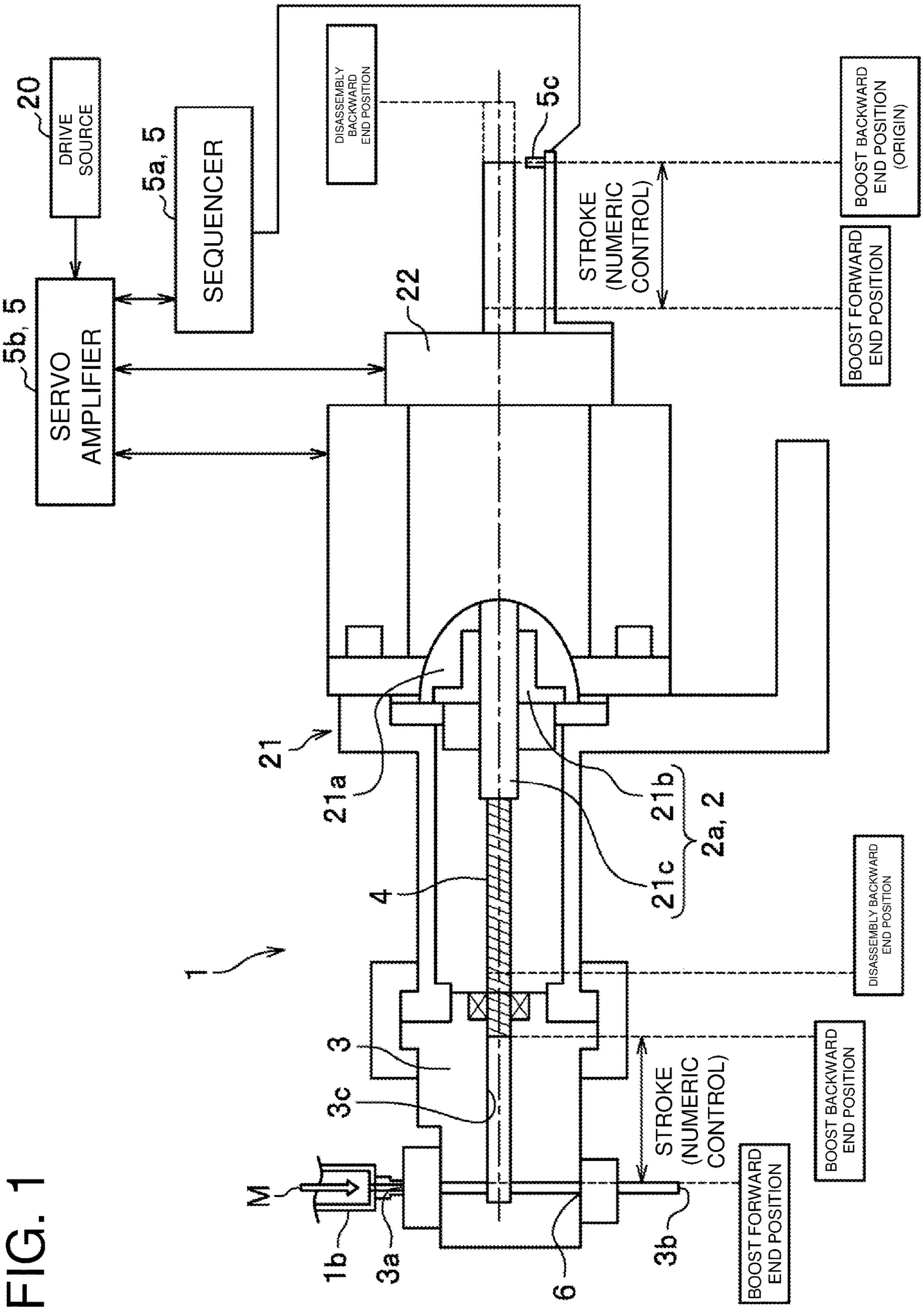
FIG. 1 is a schematic diagram of a wet atomizer according to an embodiment.
Figure 2:
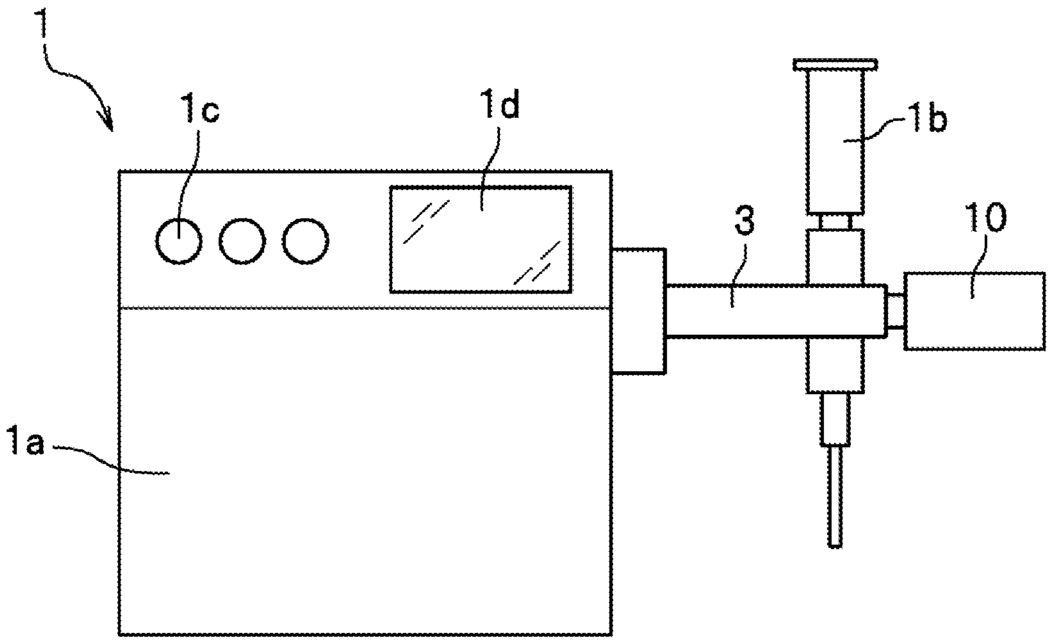
FIG. 2 is an external view of the wet atomizer according to the embodiment.
Figure 3:
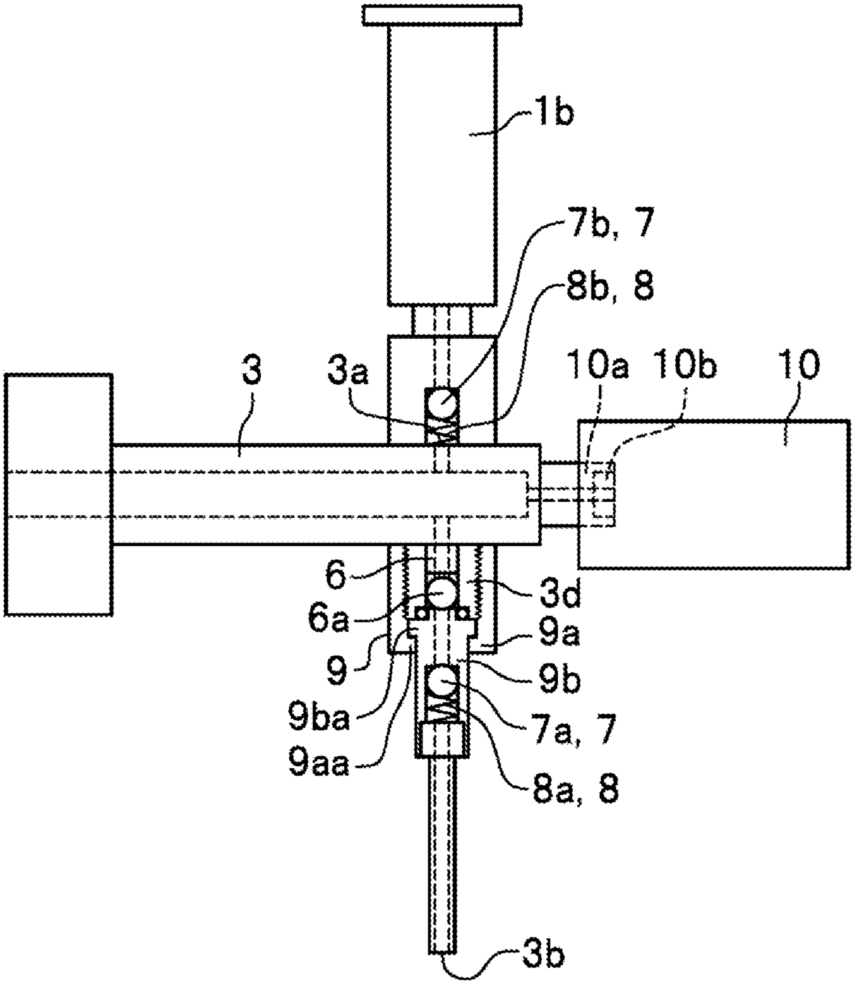
FIG. 3 is a sectional view showing a main part of the wet atomizer according to the embodiment.

As shown in FIGS. 1 to 3, a wet atomizer 1 according to the embodiment includes a power transmission device 2, a high-pressure cylinder 3, a plunger 4, a drive controller 5, a nozzle 6, a check valve 7, and an elastic member 8.

The wet atomizer 1 sucks raw material M from a suction port 3*a* into the high-pressure cylinder 3 by reciprocating motion of the plunger 4 to pressurize and discharge the sucked raw material M from a discharge port 3*b*. The wet atomizer 1 is configured by connecting the above-described components to a main body 1*a*. The wet atomizer 1 processes the raw material M by a pressing unit 1*c* and a display unit 1*d* operated by an operator while a drive source 20 is turned on and while the raw material M is supplied from a raw material tank 1*b* into the high-pressure cylinder 3.

The power transmission device 2 converts the rotational motion of a servo motor 21 into a reciprocating motion. The servo motor 21 has a hollow portion 21*a* therein. The power transmission device 2 is a high-efficiency screw mechanism 2*a* such as a ball-screw mechanism or a roller-screw mechanism.

The high-efficiency screw mechanism 2*a* includes a nut 21*b* and a screw shaft 21*c*. The high-efficiency screw mechanism 2*a* (roller-screw mechanism) is mounted inside the servo motor 21. Rotating the nut 21*b* of the high-efficiency screw mechanism 2*a* inside the servo motor 21 moves the screw shaft 21*c* forward or backward on a center axis.

The plunger 4 is coupled to an axially distal end of the screw shaft 21*c*. As a result, the forward or backward movement of the screw shaft 21*c* becomes a reciprocating movement of the plunger 4.

The servo motor 21 has a 100 V drive voltage and a 1.5 kW drive output. The high-efficiency screw mechanism 2*a* increases the power transmission efficiency. For this reason, the servo motor 21 driven by 100 V can also achieve high-pressure power.

The high-pressure cylinder 3 has a flow path 3*c* therein. The flow path 3*c* serves as a pressurizing chamber. The plunger 4 reciprocating in the flow path 3*c* increases the pressure in the flow path 3*c* and pressurizes the raw material M.

Many kinds of the raw material M and the solvent for pressurization (material, acidic or alkaline, etc.) are available. Thus, it is preferable to use a material such as stainless steel for the high-pressure cylinder 3 so as not to corrode the inside of the high-pressure cylinder 3.

The high-pressure cylinder 3 has a suction port 3*a* and a discharge port 3*b*. The suction port 3*a* sucks the raw material M supplied from a liquid supply pump (not shown). The raw material M after the pressurizing process is discharged from the discharge port 3*b*. For example, the suction port 3*a* may be disposed above the high-pressure cylinder 3. The discharge port 3*b* may be disposed below the high-pressure cylinder 3. Alternatively, the suction port 3*a* may be disposed above the high-pressure cylinder 3, and the discharge port 3*b* may be disposed on the left or right of the high-pressure cylinder 3.

The plunger 4 reciprocates inside the high-pressure cylinder 3 by the power transmission device 2 to pressurize the raw material M.

The drive controller 5 controls the reciprocating movement of the plunger 4. The drive controller 5 includes a sequencer 5*a*, a servo amplifier 5*b*, and an origin position detection sensor 5*c*. The drive controller 5 commands a target position of the plunger 4 from the sequencer 5*a* to the servo amplifier 5*b*. Here, the target position is a boost forward end position, a boost backward end position, and a disassembly backward end position of the plunger 4.

The origin position detection sensor 5*c* detects the boost backward end position of the plunger 4 as the origin. The drive controller 5 recognizes an origin serving as a reference for position control by the origin position detection sensor 5*c* prior to starting the reciprocating movement of the plunger 4. Further, a rotation angle detector 22 detects the rotation angle of the nut 21*b* of the high-efficiency screw mechanism 2*a*. Thus, the rotation angle detector 22 detects the current position. The rotation angle detector 22 is, for example, an encoder or a resolver.

The drive controller 5 controls the position of the plunger 4 by comparing the commanded target position with the current position detected by the rotation angle detector 22. This allows the wet atomizer 1 to surely suck the raw material M into the high-pressure cylinder 3 to pressurize and discharge the raw material M. The plunger 4 repeatedly moves forward and backward between the boost forward end position and the boost backward end position to suck and pressurize the raw material M. Here, the boost backward end position is a position that is retracted by one stroke from the boost forward end position.

The nozzle 6 atomizes the pressurized raw material M. The nozzle 6 has an orifice for the raw material M passing through to be atomized. The orifice has a diameter of 0.05 to 0.5 mm, for example.

As shown in FIG. 3, a spherical 6*a* is disposed in the ejection direction of the nozzle 6. By causing the raw material M ejected at high pressure to collide with the spherical 6*a*, the raw material M can be micronized or emulsified. The spherical 6*a* is a rigid body. Preferably, the spherical 6*a* is a material that is less likely to be worn or damaged by the impact of the raw material M.

The nozzle 6 may be directly connected to the high-pressure cylinder 3. As shown in FIG. 3, the wet atomizer 1 may include a nozzle holder 9. The nozzle holder 9 is coupled to the high-pressure cylinder 3. The nozzle 6 is arranged inside the nozzle holder 9. This stabilizes the ejection direction of the raw material M.

The nozzle holder 9 includes an upper nozzle holder 9*a*. The high-pressure cylinder 3 includes a high-pressure cylinder-side connection portion 3*d*. The high-pressure cylinder-side connecting portion 3*d* and the upper nozzle holder 9*a* are connected to stably fix the nozzle 6 to the high-pressure cylinder 3. A screw groove is formed on an outer surface of the high-pressure cylinder-side connecting portion 3*d* and the inner surface of the upper nozzle holder 9*a*. The upper nozzle holder 9*a* is connected to the high-pressure cylinder-side connecting portion 3*d* by screwing the upper nozzle holder 9*a* so as to cover the high-pressure cylinder-side connecting portion 3*d*. The connection between the upper nozzle holder 9*a* and the high-pressure cylinder-side connection portion 3*d* is not limited to a screw. For example, the upper nozzle holder 9*a* and the high-pressure cylinder-side connecting portion 3*d* may be connected by connection between the concave portion and the convex portion or connection between the claw portion.

Further, when connected by a screw or the like inside the flow path, the raw material M flows in the flow path, or the raw material M is clogged. This might cause rust such as a screw. Thus, the upper nozzle holder 9*a* is preferably fitted from the outer side of the high-pressure cylinder-side connecting portion 3*d*. This suppresses the occurrence of nozzle clogging, rust, and the like.

The nozzle holder 9 may include a lower nozzle holder 9*b*. The lower nozzle holder 9*b* is connected to the upper nozzle holder 9*a*. The lower nozzle holder 9*b* fixes a first check valve 7*a*, a first elastic member 8*a*, and the discharge port 3*b*. The upper nozzle holder 9*a* has a receiving portion 9*aa*. The lower nozzle holder 9*b* has a protrusion 9*ba*. By connecting the receiving portion 9*aa* and the protrusion 9*ba*, the lower nozzle holder 9*b* is connected to the upper nozzle holder 9*a* to serve as the nozzle holder 9.

The first check valve 7*a* and the first elastic member 8*a* are arranged below (downstream of) the nozzle 6. As a result, the nozzle 6 for performing the high-pressure processing is located inside the apparatus, and the external air is less likely to be sucked in.

If the first check valve 7*a* and the first elastic member 8*a* are directly connected to the high-pressure cylinder 3, and the nozzle 6 is disposed below the first check valve 7*a*, the first check valve 7*a* and the first elastic member 8*a* are disposed in a high-pressure environment. Thus, the first check valve 7*a* and the first elastic member 8*a* are easily damaged. If the first check valve 7*a* and the first elastic member 8*a* are damaged, a sealing failure or clogging of the raw material M may occur, which may adversely affect the properties of the processed raw material M ejected from the nozzle 6.

Further, when the nozzle 6 has larger diameter, the external air might be sucked in, and the processing of the raw material M becomes unstable.

As in the present embodiment, by disposing the first check valve 7*a* and the first elastic member 8*a* below the nozzle 6, the loads applied to the first check valve 7*a* and the first elastic member 8*a* are reduced, and it is possible to prevent the sealing failure and the clogging of the raw material M. This stabilizes the atomization processing and the emulsification processing of the raw material M.

Further, the small-sized raw material M ejected from the nozzle 6 and atomized by colliding with the spherical 6*a* is sealed with the first check valve 7*a* and the first elastic member 8*a*. This achieves less adverse effect due to particle size or pressure increase as compared with the case where the nozzle 6 is disposed below the first check valve 7*a* as in the conventional art to seal the raw material M having a large size prior to the atomization. This achieves more efficient sealing performance.

Figure 4:
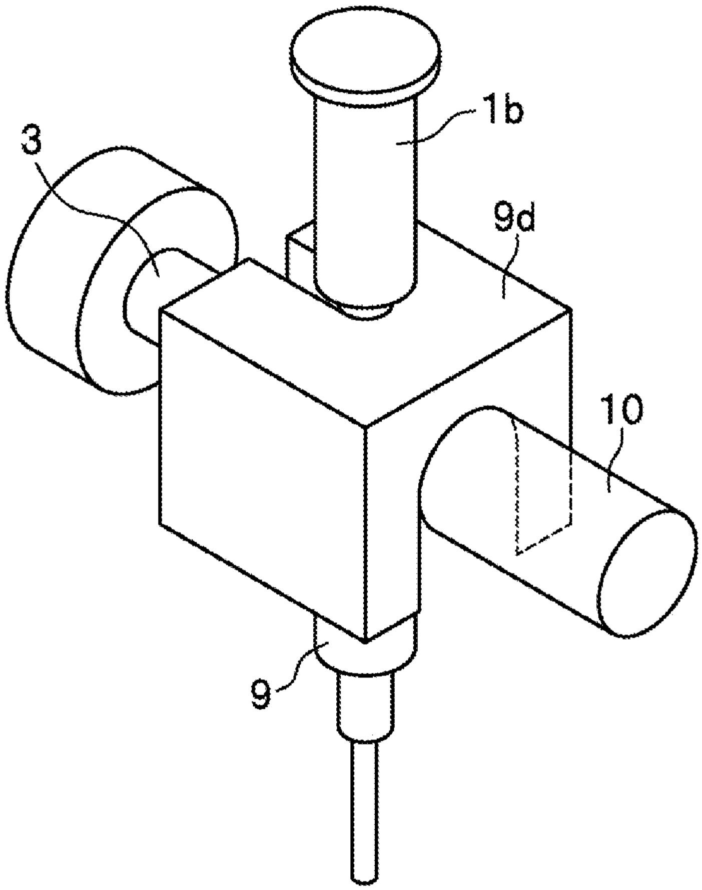
FIG. 4 is a perspective view showing a main part of the wet atomizer according to the embodiment.

As shown in FIG. 4, a protect cover 9*d* may be disposed on the outer side of the nozzle holder 9. This improves stability and vibration isolation.

As shown in FIG. 3, the check valve 7 includes a first check valve 7*a* and a second check valve 7*b*.

The first check valve 7*a* is disposed on the side of the discharge port 3*b*. Specifically, the first check valve 7*a* is disposed downstream (lower in FIG. 3) of the nozzle 6. The first check valve 7*a* does not allow air to be sucked into the high-pressure cylinder 3 from the discharge port 3*b* during the reciprocating motion of the plunger 4. When the plunger 4 is advanced, the first check valve 7*a* is opened to discharge the raw material M from the discharge port 3*b*. On the other hand, when the plunger 4 is retracted, the first check valve 7*a* is closed not to discharge the raw material M from the discharge port 3*b*. Thus, when the plunger 4 moves forward in the high-pressure cylinder 3 to discharge the raw material M from the nozzle 6 while pressurizing the raw material M, the processed raw material M is appropriately discharged from the discharge port 3*b*. On the other hand, when the plunger 4 is retracted in the high-pressure cylinder 3 to lower the pressure in the high-pressure cylinder 3, air does not enter from the discharge port 3*b*.

When the plunger 4 is repeatedly reciprocated in the high-pressure cylinder 3 while the air remains in the high-pressure cylinder 3, the pressure in the high-pressure cylinder 3 is not appropriately increased due to the influence of the sucked air. In this case, the quality of the processed raw material M varies.

Arranging the first check valve 7*a* as in the present embodiment enables to stably increase the pressure in the high-pressure cylinder 3. The first check valve 7*a* is, for example, a spherical ball.

In addition, the first check valve 7*a* is adjusted to the same position in a normal state by the first elastic member 8*a* disposed below the first check valve 7*a*. The first elastic member 8*a* presses the first check valve 7*a* toward the upstream side, which is the valve closing direction. That is, the first elastic member 8*a* presses the first check valve 7*a* toward the nozzle 6 (upward in FIG. 3). When the processed raw material M is discharged, the first check valve 7*a* and the first elastic member 8*a* are pressed downward to communicate with the outside by increasing the discharge pressure. This allows the processed raw material M to be discharged from the discharge port 3*b*.

The second check valve 7*b* is disposed on the side of the suction port 3*a*. Specifically, the second check valve 7*b* is disposed upstream (upward in FIG. 3) of the suction port 3*a*. The second check valve 7*b* does not allow air to be sucked into the high-pressure cylinder 3 from the suction port 3*a* during the reciprocating motion of the plunger 4. When the plunger 4 is retracted, the second check valve 7*b* is opened to allow the raw material M to be sucked from the suction port 3*a*. On the other hand, when the plunger 4 is advanced, the second check valve 7*b* is closed not to allow the raw material M to leak from the suction port 3*a*. Thus, when the plunger 4 is advanced in the high-pressure cylinder 3 to discharge the raw material M from the nozzle 6 while pressurizing the raw material M, the processed raw material M is appropriately discharged from the discharge port 3*b*. On the other hand, when the plunger 4 is retracted in the high-pressure cylinder 3 to lower the pressure in the high-pressure cylinder 3, air does not enter from the suction port 3*a*.

When the plunger 4 is repeatedly reciprocated in the high-pressure cylinder 3 while the air remains in the high-pressure cylinder 3, the pressure in the high-pressure cylinder 3 is not appropriately increased due to the influence of the sucked air. In this case, the quality of the processed raw material M varies.

Arranging the second check valve 7*b* as in the present embodiment enables to stably increase the pressure in the high-pressure cylinder 3. The second check valve 7*b* is, for example, a spherical ball.

In addition, the second check valve 7*b* is adjusted to the same position in a normal state by the second elastic member 8*b* disposed below the second check valve 7*b*. The second elastic member 8*b* presses the second check valve 7*b* toward the upstream side, which is the valve closing direction. That is, the second elastic member 8*b* presses the second check valve 7*b* toward the other side (upward in FIG. 3) from the suction port 3*a*. When the processed raw material M is discharged, the second check valve 7*b* and the second elastic member 8*b* are pressed upward and closed.

When the raw material M passes through the first check valve 7*a*, the second check valve 7*b* does not allow the raw material M to pass through. When the raw material M passes through the second check valve 7*b*, the first check valve 7*a* does not allow the raw material M to pass through. This allows to effectively manage the pressure in the high-pressure cylinder 3.

In the present embodiment, a single raw material tank 1*b* and a single nozzle 6 are disposed on the high-pressure cylinder 3, but the present invention is not limited thereto. A plurality of raw material tanks 1*b* and a plurality of nozzles 6 may be disposed on the high-pressure cylinder 3. This also increases the process flow rate.

In the present embodiment, the pressure in the high-pressure cylinder 3 is mechanically maintained constant by the first check valve 7*a* and the second check valve 7*b*, but the present invention is not limited thereto. For example, the first check valve 7*a* and the second check valve 7*b* may be electrically automatically switched on or off in response to the operation of the pressing unit 1*c* or the processing time of the raw material M.

As shown in FIGS. 2 to 4, the wet atomizer 1 may include a pressure detector 10 that measures the pressure in the high-pressure cylinder 3. Measuring the pressure in the high-pressure cylinder 3 allows the quality of the processed raw material M to be stabilized. Further, it is possible to detect if the wet atomizer 1 is not in a normal state.

The display unit 1*d* displays information acquired by the pressure detector 10. This allows the operator to check the state of the pressure in the high-pressure cylinder 3.

The pressure detector 10 is connected to a pressure detector connecting portion 10*a* of the high-pressure cylinder 3 via a pressure detection sealing 10*b*. This enables to accurately measure the pressure in the high-pressure cylinder 3.

Further, directly connecting the pressure detector 10 to the high-pressure cylinder 3 eliminates an additional space for detecting the pressure of the raw material M.

Figure 5:
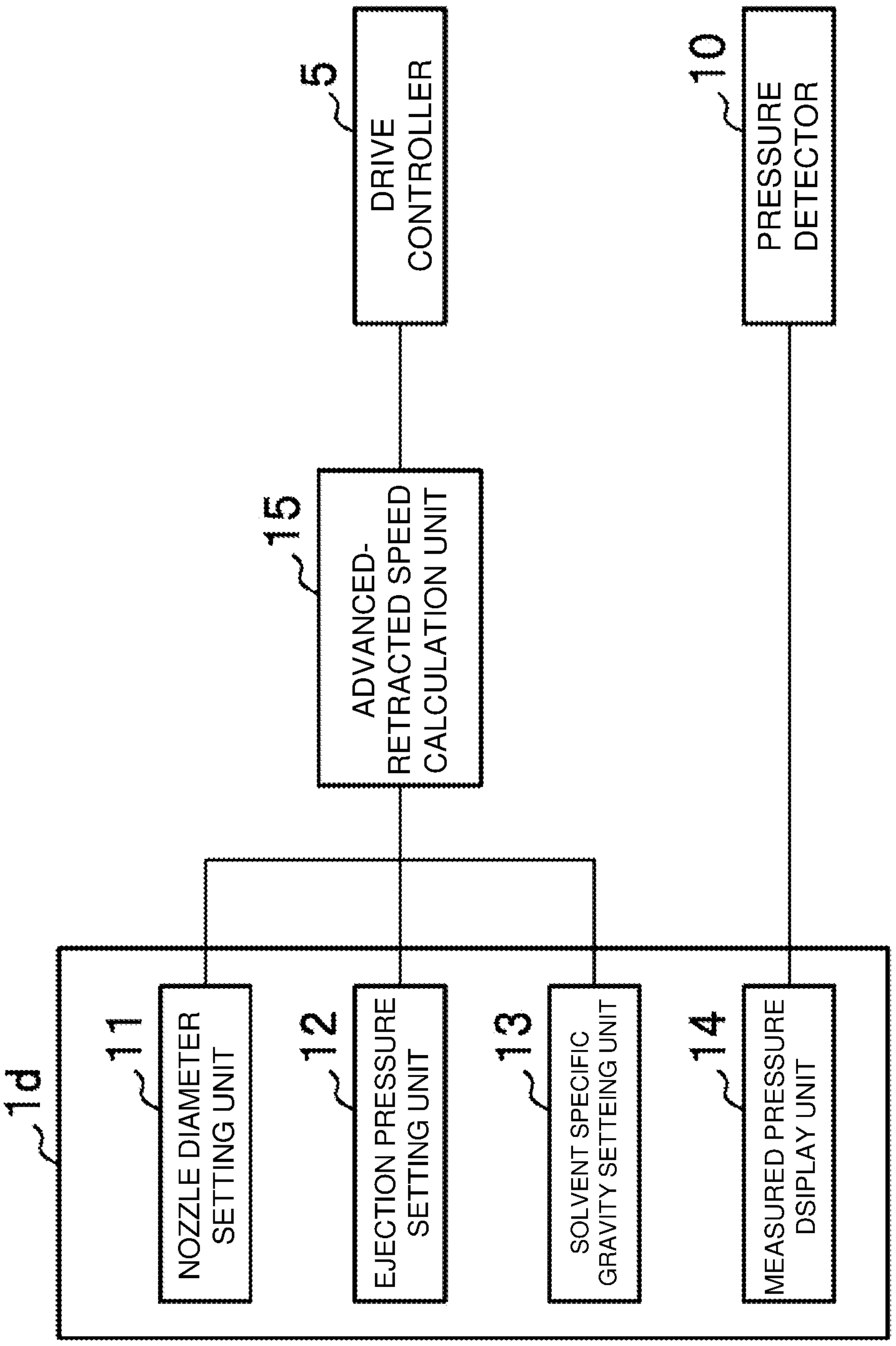
FIG. 5 is a schematic diagram of a display unit according to the embodiment.

The display unit 1*d* will be described with reference to FIG. 5. A nozzle diameter setting unit 11, an ejection pressure setting unit 12, and a solvent specific gravity setting unit 13 are disposed in the display unit 1*d*. The display unit 1*d* is, for example, a touch panel for displaying various types of information or inputting various settings.

The nozzle diameter setting unit 11 allows any one of a plurality of nozzle diameters to be selected. For example, there are three types of setting buttons, and one of 0.1 mm, 0.15 mm, 0.20 mm nozzle diameters is to be selected. The number of setting buttons is not limited to three, and may be changed as appropriate, for example, five types of setting. In addition to selecting each specific nozzle diameter, the numerical value may be manually adjusted.

The ejection pressure setting unit 12 allows a target ejection pressure to be selected. For example, there are three types of setting buttons, and one of 50 MPa, 100 MPa, 150 MPa is to be selected. The number of setting buttons is not limited to three, and may be changed as appropriate, for example, five types of setting. In addition to selecting each specific pressure, the numerical value may be manually adjusted.

The solvent specific gravity setting unit 13 allows a solvent for using to be selected. For example, there are three types of setting buttons, and any one of water, solvent A (ethanol), and solvent B (organic solvent) is to be selected. The number of setting buttons is not limited to three, and may be changed as appropriate, for example, five types of setting.

An advanced-retracted speed calculation unit 15 calculates an advanced-retracted speed of the plunger 4 based on the nozzle diameter set by the nozzle diameter setting unit 11, the target ejection pressure set by the ejection pressure setting unit 12, and the solvent specific gravity set by the solvent specific gravity setting unit 13. The advanced-retracted speed calculated by the advanced-retracted speed calculation unit 15 may be displayed on the display unit 1*d*.

A measured pressure display unit 14, which displays the ejection pressure measured by the pressure detector 10, may be arranged in the display unit 1*d*.

In addition, a numerical value relating to an environmental load such as the amount of carbon dioxide may be displayed on the display unit 1*d* by using the amount of electric power corresponding to the process time in using 100 V power supply.

The raw material M may be forcibly sucked into the high-pressure cylinder 3 from the raw material tank 1*b* by using a liquid supply pump (not shown).

A control unit (not shown) may be arranged to combine the pressure adjustment in response to the torque and the rotational speed of the servo motor 21 and the pressure adjustment in the high-pressure cylinder 3 by the pressure detector 10. This achieves highly accurate pressure management.

Specifically, when the pressure detected by the pressure detector 10 is lower than a preset value, the rotational speed of the servo motor 21 may be increased by a signal from the control unit to adjust the pressure in the high-pressure cylinder 3.

Figure 6:
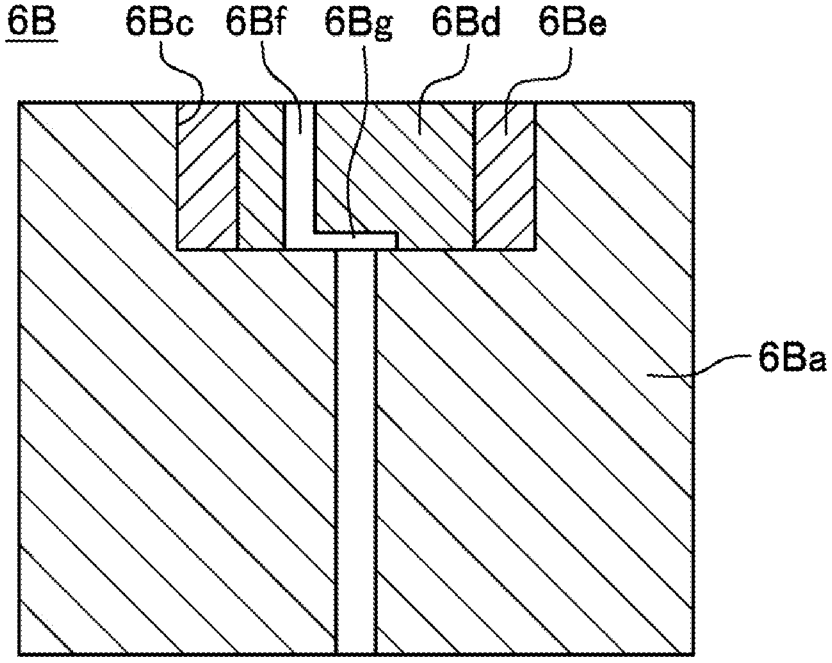
FIG. 6 is a sectional view of a modification of the nozzle according to the embodiment.

A modification of the nozzle 6 will be described with reference to FIG. 6. The nozzle 6B has a nozzle body 6Ba and a recess 6Bc. An inner chip 6Bd and an outer chip 6Be are arranged in the recess 6Bc. The raw material M passes through the inner chip 6Bd. The outer chip 6Be is disposed outside the inner chip 6Bd.

The inner chip 6Bd has a through-hole 6Bf and a nozzle groove 6Bg. The through-hole 6Bf allows the raw material M that has reached a high pressure in the high-pressure cylinder 3 to pass into the nozzle 6B. The nozzle groove 6Bg is a recess communicating with the through-hole 6Bf. In the nozzle 6B of the modification, the through-hole 6Bf and the nozzle groove 6Bg constitute an L-shaped cross-section. Thus, it is possible to reduce the diameter of the through-hole 6Bf and to effectively impart the shear caused by the flow having different flowing direction due to the nozzle groove 6Bg.

Further, as the through-hole 6Bf and the nozzle groove 6Bg are L-shaped in a cross-sectional view of the nozzle 6B of the modification, it is difficult to suck the outside air into the high-pressure cylinder 3. This effectively prevents air from being sucked in the first check valve 7*a* and the second check valve 7*b* to make the pressure in the high-pressure cylinder 3 uniform.

Figure 7:
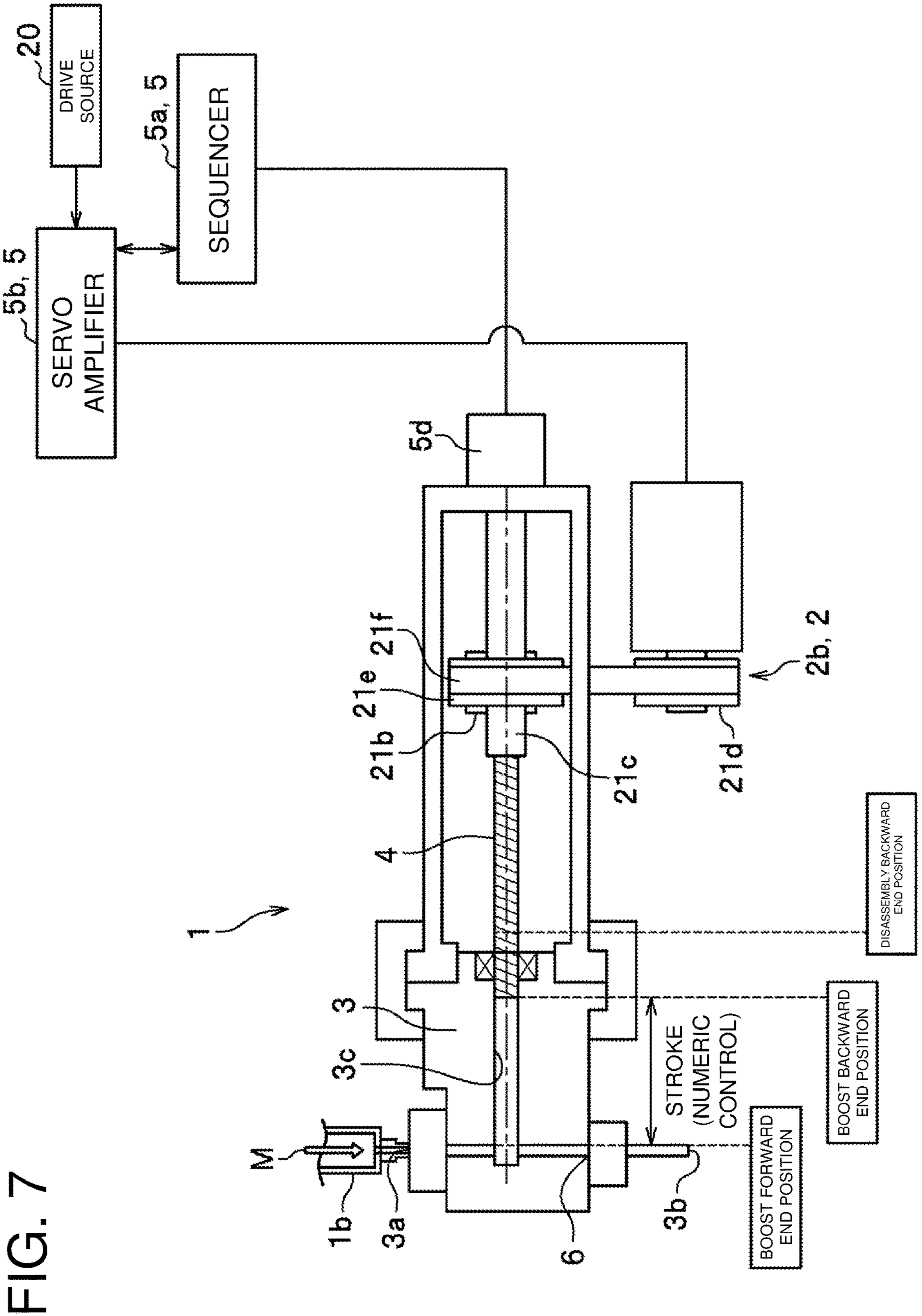
FIG. 7 is a schematic diagram of a modification of the wet atomizer according to the embodiment.

FIG. 7 shows a modified example of the power transmission device 2 and the drive controller 5. As shown in FIG. 7, the rotational drive of the servo motor 21 is transmitted to the nut 21*b* via a belt mechanism 2*b*. Rotation of the nut 21*b* advances or retracts the plunger 4 coupled to the screw shaft 21*c*. The belt mechanism 2*b* includes a first pulley 21*d*, a second pulley 21*e*, and a belt 21*f*. The first pulley 21*d* is coupled to the shaft of the servo motor 21. The second pulley 21*e* is coupled to the nut 21*b*. The belt 21*f* is extended across the first pulley 21*d* and the second pulley 21*e*. The drive controller 5 adjusts the forward and backward strokes by detecting the end portion of the screw shaft 21*c* by the end detecting portion 5*d*.

Next, a method of using the wet atomizer 1 according to the present embodiment will be described.

First, the operator drives the drive source 20 to bring the power transmission device 2 and the drive controller 5 into a standby state. Further, the operator connects the raw material tank 1*b* to the suction port 3*a* of the high-pressure cylinder 3.

Next, while the wet atomizer 1 is prepared, the pressing unit 1*c* and the display unit 1*d* are operated to set the pressure applied to the raw material M, and thus the atomization process of the raw material M is started.

The processing time, the number of times of processing, and the like can also be set as appropriate. After completion of the designated work, the processed raw material M is filled in a container to be stored.

By setting the nozzle diameter, the ejection pressure, and the solvent specific gravity using the nozzle diameter setting unit 11, the ejection pressure setting unit 12, and the solvent specific gravity setting unit 13, the advanced-retracted speed of the plunger 4 is calculated, and then the drive controller 5 can set an appropriate operating value. Further, it is possible to adjust the pressurizing pressure for processing the raw material M while checking the actual pressure measured by the pressure detector 10.

The wet atomizer 1 according to the present embodiment enables to prevent excess air from being taken in, for example, even when the nozzle diameter is changed. This stably increases the pressure in the pressurizing chamber to perform the raw material process with high reproducibility.

Verification Test

In the wet atomizer 1, the change in the discharge amount was verified between the case where the check valve 7 and the elastic member 8 are disposed and the case where the check valve 7 and the elastic member 8 are not disposed. The nozzle 6 has a diameter of 0.1 mm, and 0.15 mm, respectively.

In case of using the nozzle 6 having a diameter of 0.1 mm, 40 MPa and 60 MPa discharge pressure, which is a pressure-zone often used, was measured, although the largest 100 MPa was assumed. The discharge rate of 3.0 ml/shot was measured as an appropriate value.

In case of the discharge pressure of 40 MPa, and when the check valve 7 and the elastic member 8 were disposed, the discharge rate was 3.0 ml/shot. On the other hand, when the check valve 7 and the elastic member 8 were not disposed, the discharge rate was 2.8 ml/shot.

In case of the discharge pressure of 60 MPa, and when the check valve 7 and the elastic member 8 were disposed, the discharge rate was 2.9 ml/shot. On the other hand, when the check valve 7 and the elastic member 8 were not disposed, the discharge rate was 2.8 ml/shot.

In case of using the nozzle having a diameter of 0.15 mm, 5 MPa and 15 MPa discharge pressure, which is a pressure-zone often used, was measured, although the largest 20 MPa was assumed. The discharge rate of 3.0 ml/shot was measured as an appropriate value.

In case of the discharge pressure of 5 MPa, and when the check valve 7 and the elastic member 8 were disposed, the discharge rate was 2.9 ml/shot. On the other hand, when the check valve 7 and the elastic member 8 were not disposed, the discharge rate was 2.7 ml/shot.

In case of the discharge pressure of 15 MPa, and when the check valve 7 and the elastic member 8 were disposed, the discharge rate was 2.9 ml/shot. On the other hand, when the check valve 7 and the elastic member 8 were not disposed, the discharge rate was 2.8 ml/shot.

According to the verification test, it was confirmed that arranging the check valve 7 and the elastic member 8 increases the discharge rate and stabilizes the processing amount.

In the case where the check valve 7 and the elastic member 8 are not disposed as in the conventional structure, air bleeding work may be performed about 4 to 10 times for stabilizing the discharge rate depending on the raw material M. On the other hand, in the case where the check valve 7 and the elastic member 8 are disposed as in the present embodiment, it was confirmed that the discharge rate is stabilized by performing the air bleeding operation of about 2 to 3 times.

As described above, the present invention is not limited to the above-described embodiments, and the present invention can be appropriately modified without departing from the gist thereof.

REFERENCE SIGNS LIST

1 Wet atomizer
1*a* Main body
1*b* Raw material tank
1*c* Pressing unit
1*d* Display unit
2 Power transmission device
2*a* High-efficiency screw mechanism
3 High-pressure cylinder
3*a* Suction port
3*b* Discharge port
3*c* Flow path
4 Plunger
5 Drive controller
5*a* Sequencer
5*b* Servo amplifier
5*c* Origin position detection sensor
6, 6B Nozzle
6Bf Through-hole
6Bg Nozzle groove
7 Check valve (first check valve 7*a*, second check valve 7*b*)
8 Elastic member (first elastic member 8*a*, second elastic member 8*b*)
9 Nozzle holder
9*d* Protect cover
10 Pressure detector
10*a* Pressure detector connecting portion
10*b* Pressure detection sealing
11 Nozzle diameter setting unit
12 Ejection pressure setting unit
13 Solvent specific gravity setting unit
14 Measured pressure display unit
15 Advanced-retracted speed calculation unit
20 Drive source
21 Servo motor
21*a* Hollow portion
21*b* Nut
21*c* Screw shaft
22 Rotation angle detector
M Raw materials

What is claimed is:

1. A wet atomizer, comprising:
- a motor;
- a power transmission device configured to convert a rotational motion of the motor into a reciprocating motion;
- a high-pressure cylinder;
- a plunger configured to reciprocate inside the high-pressure cylinder by the power transmission device to pressurize raw materials;
- a drive controller configured to control the reciprocating motion of the plunger;
- a nozzle configured to atomize pressurized raw material;
- a first check valve disposed downstream of the nozzle; and
- a first elastic member configured to press the first check valve.

2. The wet atomizer according to claim 1, wherein the high-pressure cylinder includes
- a suction port configured to suck the raw material, and a discharge port configured to discharge the raw material, the wet atomizer further comprising:

a second check valve disposed upstream of the nozzle; and a second elastic member configured to press the second check valve.

3. The wet atomizer according to claim 2, further comprising:

a pressure detector configured to measure a pressure inside the high-pressure cylinder.

4. The wet atomizer according to claim 2, further comprising:

a nozzle holder disposed on the high-pressure cylinder to accommodate the nozzle.

5. The wet atomizer according to claim 2, further comprising:

a display unit including a nozzle diameter setting unit configured to set any one of nozzle diameter among plurality of nozzle diameters, an ejection pressure setting unit configured to set a target ejection pressure, and a solvent specific gravity setting unit configured to set a solvent for using, and an advanced-retracted speed calculation unit configured to calculate an advanced-retracted speed of the plunger based on the nozzle diameter, the target ejection pressure, and a solvent specific gravity.

6. The wet atomizer according to claim 2, wherein the nozzle has a through-hole configured to allow the raw material that has reached a high pressure in the high-pressure cylinder to pass through, and a nozzle groove communicating with the through-hole, and the through-hole and the nozzle groove constitute an L-shaped cross section.

7. The wet atomizer according to claim 1, further comprising:

a pressure detector configured to measure a pressure inside the high-pressure cylinder.

8. The wet atomizer according to claim 7, wherein the high-pressure cylinder includes a detector connecting portion, and the pressure detector is coupled to the detector connecting portion via a pressure detection sealing.

9. The wet atomizer according to claim 8, further comprising:

a nozzle holder disposed on the high-pressure cylinder to accommodate the nozzle.

10. The wet atomizer according to claim 8, further comprising:

a display unit including a nozzle diameter setting unit configured to set any one of nozzle diameter among plurality of nozzle diameters, an ejection pressure setting unit configured to set a target ejection pressure, and a solvent specific gravity setting unit configured to set a solvent for using, and an advanced-retracted speed calculation unit configured to calculate an advanced-retracted speed of the plunger based on the nozzle diameter, the target ejection pressure, and a solvent specific gravity.

11. The wet atomizer according to claim 7, further comprising:

a nozzle holder disposed on the high-pressure cylinder to accommodate the nozzle.

12. The wet atomizer according to claim 7, further comprising:

a display unit including a nozzle diameter setting unit configured to set any one of nozzle diameter among plurality of nozzle diameters, an ejection pressure setting unit configured to set a target ejection pressure, and a solvent specific gravity setting unit configured to set a solvent for using, and an advanced-retracted speed calculation unit configured to calculate an advanced-retracted speed of the plunger based on the nozzle diameter, the target ejection pressure, and a solvent specific gravity.

13. The wet atomizer according to claim 7, wherein the nozzle has a through-hole configured to allow the raw material that has reached a high pressure in the high-pressure cylinder to pass through, and a nozzle groove communicating with the through-hole, and the through-hole and the nozzle groove constitute an L-shaped cross section.

14. The wet atomizer according to claim 1, further comprising:

a nozzle holder disposed on the high-pressure cylinder to accommodate the nozzle.

15. The wet atomizer according to claim 14, further comprising:

a protect cover disposed outside the nozzle holder.

16. The wet atomizer according to claim 14, further comprising:

a display unit including a nozzle diameter setting unit configured to set any one of nozzle diameter among plurality of nozzle diameters, an ejection pressure setting unit configured to set a target ejection pressure, and a solvent specific gravity setting unit configured to set a solvent for using, and an advanced-retracted speed calculation unit configured to calculate an advanced-retracted speed of the plunger based on the nozzle diameter, the target ejection pressure, and a solvent specific gravity.

17. The wet atomizer according to claim 15, further comprising:

a display unit including a nozzle diameter setting unit configured to set any one of nozzle diameter among plurality of nozzle diameters, an ejection pressure setting unit configured to set a target ejection pressure, and a solvent specific gravity setting unit configured to set a solvent for using, and an advanced-retracted speed calculation unit configured to calculate an advanced-retracted speed of the plunger based on the nozzle diameter, the target ejection pressure, and a solvent specific gravity.

18. The wet atomizer according to claim 1, further comprising:

a display unit including a nozzle diameter setting unit configured to set any one of nozzle diameter among plurality of nozzle diameters, an ejection pressure setting unit configured to set a target ejection pressure, and a solvent specific gravity setting unit configured to set a solvent for using, and an advanced-retracted speed calculation unit configured to calculate an advanced-retracted speed of the plunger based on the nozzle diameter, the target ejection pressure, and a solvent specific gravity.

19. The wet atomizer according to claim 18, wherein the display unit includes a measured pressure display unit configured to display an ejection pressure measured by the pressure detector.

20. The wet atomizer according to claim 1, wherein the nozzle has a through-hole configured to allow the raw material that has reached a high pressure in the high-pressure cylinder to pass through, and a nozzle groove communicating with the through-hole, and the through-hole and the nozzle groove constitute an L-shaped cross section.

* * * * *